(12) United States Patent
Kim

(10) Patent No.: US 8,157,947 B2
(45) Date of Patent: Apr. 17, 2012

(54) METHOD AND APPARATUS FOR FABRICATING COMPOSITE PROTECTIVE MATERIAL

(75) Inventor: Daniel Kim, Portland, OR (US)

(73) Assignee: Applied FT Composite Solutions Inc., Las Vegas, NV (US)

( * ) Notice: Subject to any disclaimer, the term of this patent is extended or adjusted under 35 U.S.C. 154(b) by 1036 days.

(21) Appl. No.: 11/796,373

(22) Filed: Apr. 27, 2007

(65) Prior Publication Data

US 2008/0264557 A1    Oct. 30, 2008

(51) Int. Cl.
*B32B 37/00* (2006.01)
*B32B 38/00* (2006.01)
*B32B 38/04* (2006.01)

(52) U.S. Cl. ........ 156/261; 156/250; 156/251; 156/252; 156/256; 156/264; 156/265

(58) Field of Classification Search .......... 156/250–252, 156/356, 364, 265
See application file for complete search history.

(56) References Cited

U.S. PATENT DOCUMENTS

| | | |
|---|---|---|
| 3,020,186 A | 2/1962 | Lawrence |
| 3,285,768 A | 11/1966 | Habib |
| 3,591,443 A | 7/1971 | Cox |
| 3,833,439 A | 9/1974 | Smith |
| 4,008,115 A | 2/1977 | Fairbanks et al. |
| 4,197,342 A | 4/1980 | Bethe |
| 4,538,301 A | 9/1985 | Sawatzki et al. |
| 4,708,760 A | 11/1987 | Mark et al. |
| 4,730,761 A * | 3/1988 | Spano ........................ 225/2 |
| 5,020,156 A | 6/1991 | Neuhalfen |
| 5,325,537 A | 7/1994 | Marion |
| 5,423,087 A | 6/1995 | Krent et al. |
| 5,462,623 A | 10/1995 | Day |
| 5,622,587 A | 4/1997 | Barthelman |
| 6,295,654 B1 | 10/2001 | Farrell |
| 6,507,955 B1 | 1/2003 | Fee et al. |
| 6,743,325 B1 | 6/2004 | Taylor |
| 6,969,548 B1 | 11/2005 | Goldfine |
| 2004/0109994 A1 | 6/2004 | Ma et al. |
| 2005/0042414 A1* | 2/2005 | Malay et al. ................. 428/98 |

FOREIGN PATENT DOCUMENTS

GB    1162147    8/1969

* cited by examiner

*Primary Examiner* — Mark A Osele
*Assistant Examiner* — Christopher C Caillouet
(74) *Attorney, Agent, or Firm* — Joseph Hyosuk Kim; JHK Law

(57) ABSTRACT

The present invention is directed to a method and apparatus for manufacturing a composite, foam/fabric material for use as protective material in products, and utilizes an apparatus which includes a punch press with punches arranged in rows and correspondingly aligned dies for receiving the punches therethrough. The system operates by punching a sheet of foam material into a plurality of discrete foam elements which are transferred onto a heated fabric substrate, and retained thereon by heat bonding. The apparatus consists, in one preferred embodiment, of a clamp plate which clamps a sheet of foam material onto a die plate, and after a punching sequence, the sheet of foam material, along with the sheet of fabric material, are indexed downstream, and the process repeats.

3 Claims, 4 Drawing Sheets

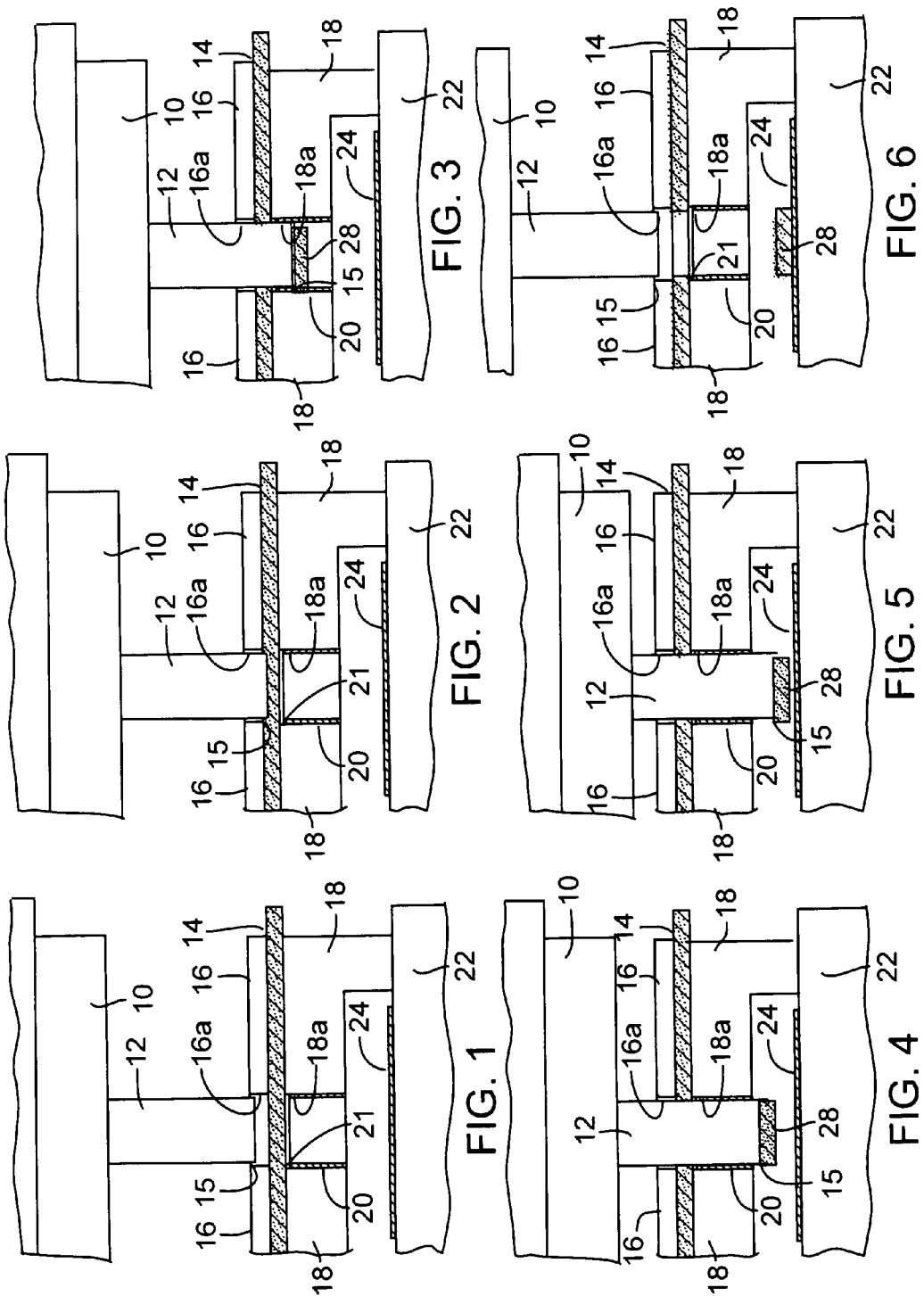

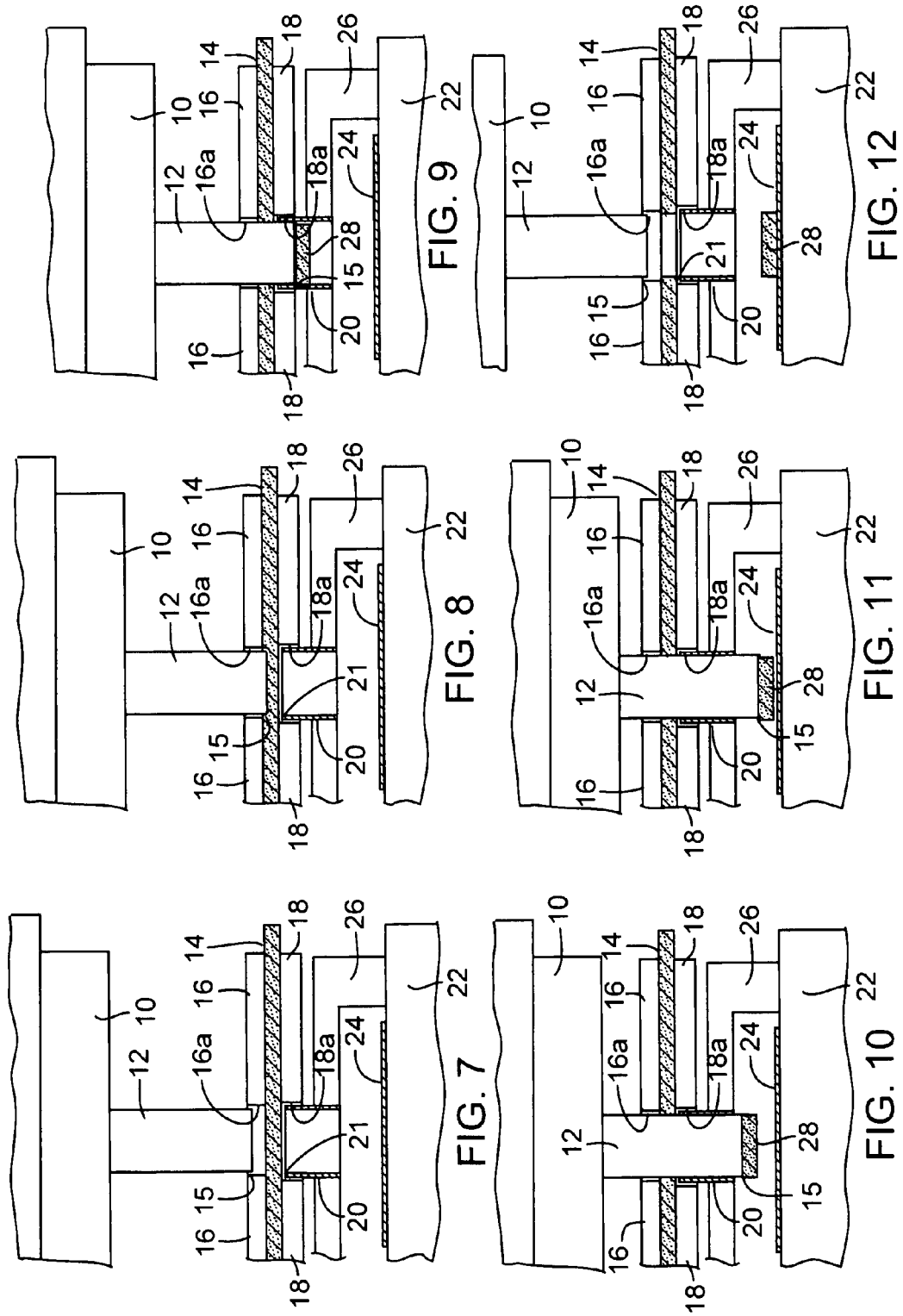

METHOD AND APPARATUS FOR FABRICATING COMPOSITE PROTECTIVE MATERIAL

BACKGROUND AND SUMMARY OF THE INVENTION

The present invention relates to a method and apparatus for manufacturing a composite, foam/fabric material for use as protective material in products such as shin guards, helmets, baseball chest protectors, bicycle seats, chairs, shoulder pads, carry bag straps, sports bras, etc. The invention is directed to providing a foam/fabric construction which may be used as a liner, and consists of a fabric top and bottom between which is sandwiched foam material, such as a plurality of discrete foam elements, which may themselves be formed as composites of different types of foams. The foam material may consist of a single material such as EVA, polyethylene (PE), polyurethane or polyvinyl, amongst others, or alternatively, the foam elements may be composites of EVA, PE, etc. The foam elements may be cylindrical in form, hexagonal, square, or other desired shapes. This material can be used, as mentioned above, for shin guards, and even components of sports equipment. The method and apparatus enables a foam sheet to be cut into foam elements which are then deposited and pressed onto a heated substrate, such as a fabric, to provide foam/fabric bonding. An upper fabric sheet may be then be adhered to the other side of the foam elements, with the resulting composite foam/fabric thereby forming a material for use in a multitude of applications, as mentioned above.

The method of the present invention utilizes an apparatus which includes a punch press with a plurality of horizontally aligned, elongate punches, which may be arranged in rows, and correspondingly aligned dies on a die plate for receiving the punches therethrough. The system may process a sheet of foam material that is sliced by the punches and dies into a plurality of discrete foam elements which are transferred to and pressed onto the heated fabric substrate, and partially melted to be retained thereon by heat bonding. The advantages of the present technology will be understood more readily after consideration of the drawings and the detailed description of the preferred embodiments.

BRIEF DESCRIPTION OF THE DRAWINGS

Embodiments of the various aspects of the present invention will be described with reference to the drawing figures as set forth below:

FIG. 1 is a side schematic view, partially cut away, showing the construction of a single punch, extending from an upper platen, disposed in an initial position adjacent a clamp plate, with the clamp plate holding a sheet of foam material against the upper surface of a die plate;

FIG. 2 is a view similar to FIG. 1, showing downward extension of the upper platen so that the punch engages the top surface of the foam sheet;

FIG. 3 is a view of the upper platen further extended downwardly so that the punch sheers off a foam element from the foam sheet;

FIG. 4 is a view showing the upper platen further extended downwardly, so that the punch is shown pushing the severed foam element down toward a fabric sheet which has been heated by heating elements, such as a plurality of electrodes which are incorporated in a lower support plate;

FIG. 5 shows further extension of the upper platen and the punch to deposit the severed foam element downwardly against the heated fabric sheet;

FIG. 6 shows retraction of the upper platen and the punch with the foam element retained on the heated fabric sheet;

FIGS. 7-12 illustrate schematically views similar to that of FIGS. 1-6, but include a construction where there are a pair of clamp plates disposed above the die plate.

DETAILED DESCRIPTION OF THE PREFERRED EMBODIMENTS

Figure 13:
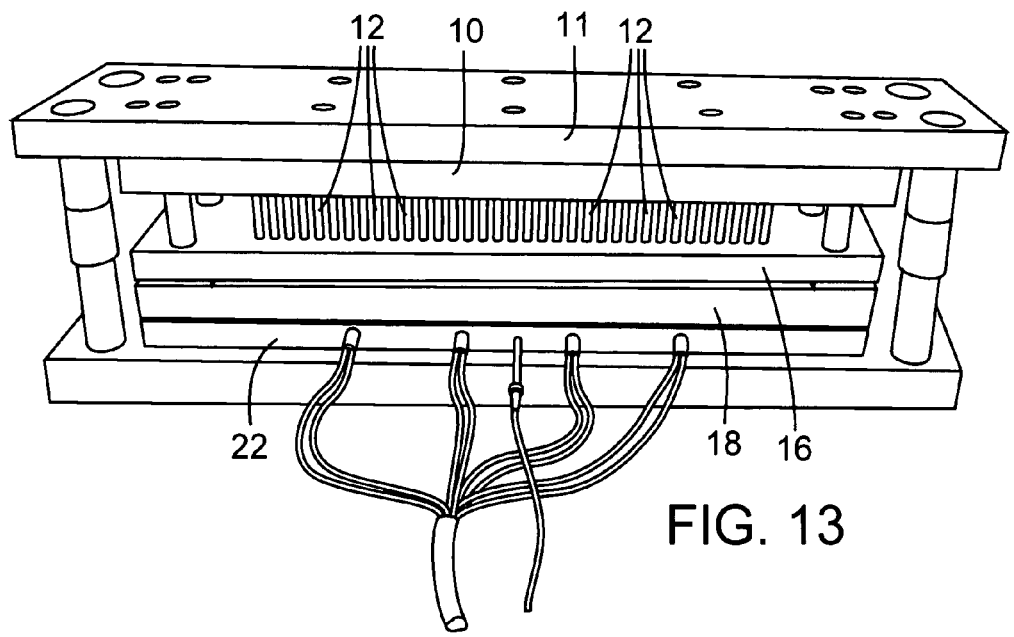
FIG. 13 is a more complete view of the apparatus, with the construction shown in FIGS. 1-6, showing assembly of the upper platen, mounted on guide posts for reciprocal movement toward a lower platen, wherein the upper platen consists of a plurality of punches, and the clamp plate is shown above the die plate, which in turn is mounted above a bottom plate which includes heating elements extending therethrough for providing heat to the fabric sheet.

As stated at the outset, the present invention is directed to a method and apparatus for fabricating and depositing a plurality of discrete foam elements onto a heated fabric sheet which serves as a substrate, and includes, in general terms, a punch assembly operable for punching into a foam sheet to cut away or shear off and then deposit foam elements onto the heated fabric sheet. The heating of the fabric sheet enables bonding between the foam elements and the fabric sheet, and the composite foam/fabric sheet is then indexed downstream and a second fabric sheet is bonded to the upper surface of the foam elements, thereby creating a foam/fabric composite which can be utilized in many different applications, for protection and use as shin guards, protective linings for helmets, baseball chest protectors, etc.

Another aspect of the present invention is that the apparatus is so constructed so that a foam sheet, which is severed into the plurality of discrete foam elements, may comprise a composite in itself, in other words, the foam sheet can be made up of a composite of EVA, polyurethane, etc. The present invention enables the foam sheet, whether of unitary construction or of composite construction, to be placed above a die plate, and upon actuation of a power-driven press, a plurality of punches are displaced downwardly and driven into the foam sheet for simultaneously severing off a plurality of discrete foam elements and depositing them onto a heated sheet of fabric material.

For simplicity of explanation, an initial description will proceed here with reference to FIGS. 1-6, which show only the operation of a single punch to form a single foam element. The preferred embodiments will all include a plurality of spaced-apart punches, so that a plurality of discrete, foam elements are deposited upon a heated sheet of fabric material. As shown in FIG. 1, an upper platen/punch plate is indicated generally at 10, and is positioned beneath a hydraulic press or the like (not shown). Upper platen 10 includes a plurality of punches, and as just mentioned, only the actuation of one punch, such as indicated at 12, will be described, with the understanding that applicant's method and apparatus includes multiple punches, arranged in side-by-side, elongate parallel rows, each having a free distal end and an end attached to the platen. As shown in FIG. 1, upper platen 10 is in its retracted position, thereby retracting punch 12 as well.

A sheet of foam material, indicated at 10, has been indexed to a position so that it is mounted on the top surface of a die plate 18. The foam sheet is then clamped by a clamp plate 16 against the die plate so that it is sandwiched therebetween. The clamp plate includes an aperture 16a aligned with and dimensioned for receiving punch 12 therethrough when upper platen 10 is moved downwardly. Die plate 18 is provided with an aperture 18a extending therethrough as well, and may be provided with a cylindrical cutting element such as indicated at 20, provided with an upper edge 21. Die plate 18 is suitably mounted above a support structure 22, which in turn supports a substrate, such as a sheet of fabric material, indicated at 24. While not specifically shown in FIG. 1, the support structure may include heating elements, such as a plurality of electrodes for suitably heating fabric material 24 (see FIG. 13).

The Method of Fabrication

As shown in FIG. 1, foam material 14 has been positioned against die plate 18 and is held securely thereagainst by means of clamp plate 16. FIGS. 2-6 follow in sequence the punching action, which will now be described. Initially, a sheet of foam material 14 of selected composition is suitably indexed into position so that it lies on the upper surface of die plate 18, and clamp plate 16 is displaced downwardly to secure the foam material onto the die plate. FIGS. 1-6 show foam material 14 as being of a single, as opposed to a composite of foam material, but it should be remembered that a composite construction could be readily employed, i.e., a sheet of EVA, superimposed onto a sheet of different foam material, such as PE. As shown in FIG. 2, the press has been actuated to move upper platen 10 and punch 12 downwardly, to extend through aperture 16a of clamp plate 16 to a position where the end of punch 12 engages the top surface of foam material 14. As shown in FIG. 3, further displacement downwardly of upper platen 10 forces punch 12 through foam material 14 so that the foam material is severed by upper edge 21 of the cutting element 20 to create a foam element, such as indicated at 28, with a thickness the same as that of the foam sheet. Any desired thickness can be achieved by appropriate selection of the thickness of the sheet material. For most applications, the thickness may be in the range of ⅛"-½", but this can vary widely. As shown in FIGS. 3 and 4, as upper platen 10 is moved downwardly further, foam element 28 is pushed downwardly onto and compressed slightly against the top of fabric material 24 as shown in FIG. 5.

The press is operated to hold the foam element against fabric material 24 for a selected duration, for example, approximately 3-10 seconds, a time sufficient for heat transfer to fabric material 24 to heat foam element 28 and create a heat bond between it and the fabric material. The amount of heat is determined by that sufficient to cause heat bonding between the foam element and the sheet. Then, as shown in FIG. 6, as upper platen 10 is retracted upwardly, punch 12 is also moved upwardly. Clamp plate 16 is then released and foam sheet 14 is indexed to present a new, unbroken surface beneath punch 12, and the fabric sheet, with the foam elements now attached, is indexed downstream as well. The process then repeats with clamp plate 16 being actuated to hold the foam material against die plate 18 and actuation of upper platen 10 again is completed to cut or sever another foam element away from the foam sheet for being deposited and adhered to fabric sheet 24.

The present invention, as described above with respect to FIGS. 1-6, contemplates the use of a single clamp plate 16, which is apertured, but another embodiment is shown in FIGS. 7-12. That embodiment contemplates that there are two clamp plates, one shown at 16 and the other shown at 18. The operation for cutting and depositing a plurality of discrete, foam elements is essentially the same, except that the provision of a second clamp plate, which serves as a surface for holding foam element 14, is disposed beneath clamp plate 16. Otherwise, the operation is essentially the same as described.

The description of the invention with respect to FIGS. 1-12 has been with schematic diagrams, showing operation of a single punch. With respect to FIGS. 13-15, views are shown with a multiplicity of punches, which are arranged in rows and other features are delineated. For example, in FIG. 13, which shows the apparatus with the hydraulic press removed, it can be seen that the upper platen is positioned with a plurality of punches extending downwardly therethrough. The foam material is not shown, nor is the fabric material. However, it will be noted that at opposite ends of the bottom support there are provided upright posts, upon which the upper platen can move upwardly and downwardly.

Figure 14:
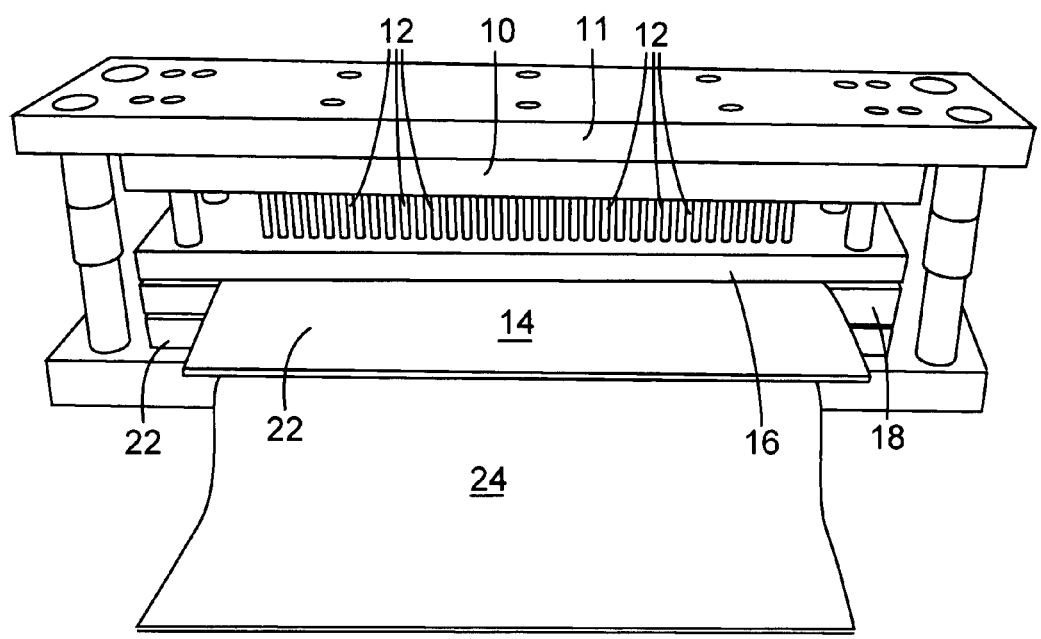
FIG. 14 is a view, similar to FIG. 13, showing positioning of the foam sheet between the clamp plate and the die plate, with the fabric material shown positioned on top of the bottom plate.

Cylindrical sleeves are mounted around each of the posts, and provided with a plurality of ball bearings, for receiving an upper sleeve. The posts are provided with springs to normally bias the upper platen upwardly. As shown in FIG. 13, the bottom plate is provided with a plurality of heating elements, such as electrodes, so that when fabric material is placed on the bottom plate, it will be heated. As shown in FIG. 14, again with the hydraulic press removed, it will be noted that the foam material, indicated at 14, has now been positioned on the upper surface of the die plate and clamped in place beneath the clamp plate. The fabric sheet material, indicated at 24, is shown extending beneath the die plate, and on the support plate, which is, as mentioned, provided with the heating elements.

Figure 15:
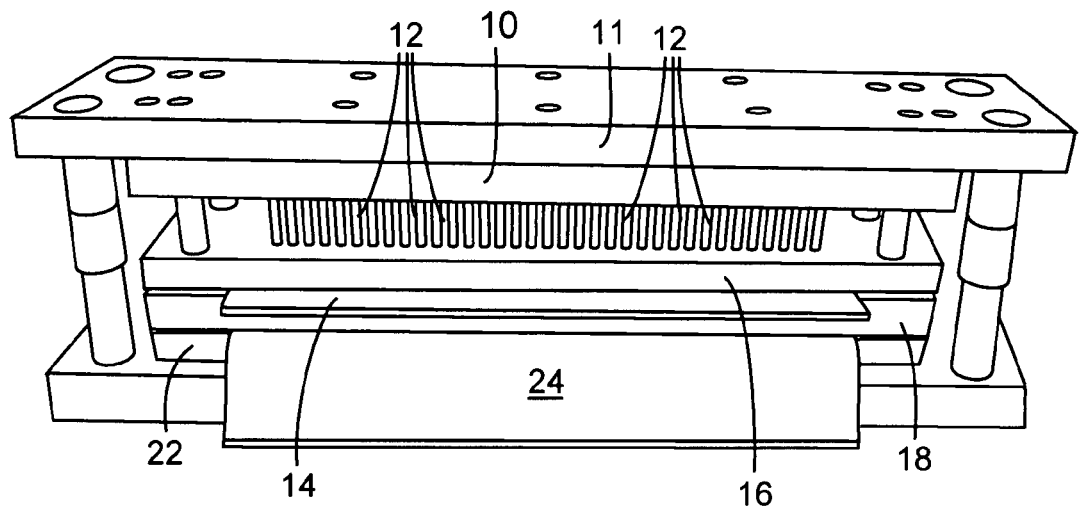
FIG. 15 is a view similar to FIGS. 13 and 14, showing assembly of the actuator press mounted on top of the upper platen, and also shows the relative positions of the foam sheet and fabric sheet.
Figure 16:
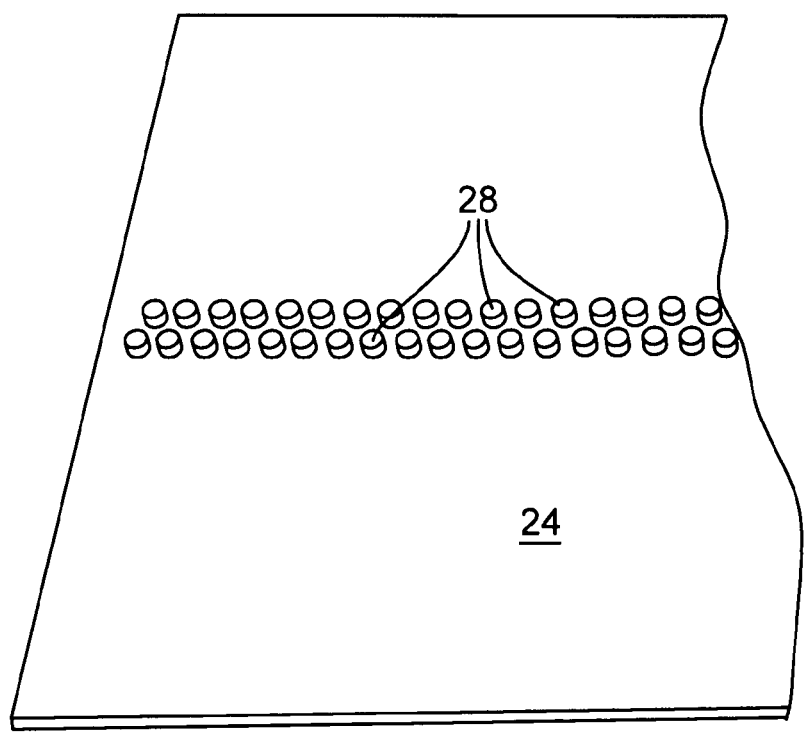
FIG. 16 is a view showing two rows of a plurality of discrete foam elements which have been punched out of a foam sheet and deposited on a fabric sheet and adhered by heat bonding in accordance with the method and apparatus of the present invention.

The entire assembly, with the hydraulic press in position, is shown in FIG. 15, prior to a run for producing a plurality of foam elements for bonding to a fabric sheet. Depending on the size of the apparatus which is to be used, a series of rows of apertures are provided in the die plate, as well as the clamp plate, and upon sequential operation, a plurality of discrete foam elements are deposited and adhered to the sheet material. As shown in FIG. 16, two rows of foam elements have been cut and bonded to foam sheet 24. After a requisite number of foam elements are deposited upon the sheet material, that sheet may be removed and in a subsequent operation an upper layer of fabric material or foam, or plastic or other material may be adhered to the upper surface of the individual foam elements. In that manner, a composite construction can be manufactured. Suitable trimming and sizing for the particular end use of the product can then be carried out to create the desired form and shape. The overall simplicity of the present invention resides in its construction for enabling a sheet of foam material to be readily punched out into a plurality of foam elements which may be readily adhered to a sheet of fabric material or other type of backing member, as desired.

The foam elements as shown in the drawing figures are cylindrical, but other forms could readily be utilized. Hexagons are one example, others could be round, square, rectangular, octagonal, or combinations thereof, all in a single protective product. Again, by "protective product" we are referring to a shin guard liner, sock/shoe liners, helmet liners, chest protectors, etc. As yet another example is a special pad that a baseball player uses for the hand which fits inside of a baseball glove, fabricated from the flexible, composite foam/fabric material manufactured utilizing the method and apparatus of the present invention. The apparatus may be thought of as a hydraulic heat press for cutting discrete foam cells and pushing them onto a fabric so that the foam cells are heat-bonded onto the fabric.

Moreover, by suitably configuring the punches and associated aligned dies, foam elements of various configurations may be created for placement adjacent one another in any selected pattern on the fabric sheet.

What is claimed is:

1. A method of cutting foam elements from a foam sheet and attaching the foam elements to a fabric substrate comprising:

positioning the foam sheet between a platen with a plurality of elongate punches with punch near ends fixed to the punch plate and punch distal ends extending away from the plate; and a die plate with a plurality of apertures, the punch ends and die apertures substantially equal in diameter and configured to engage the punches in the die apertures;

moving the platen toward the die plate;

advancing the plurality of punches toward the sheet and the die apertures;

cutting the elements from the sheet as the punch distal ends pass through the die apertures;

pressing the foam elements to the fabric substrate with the punch ends;

attaching the foam elements to the fabric substrate with the punch ends;

retracting the punches and separating the punch distal ends from the cut element fixed to the fabric substrate; and moving the platen in relation to the die plate to a second position with the punches and punch ends disengaged and physically spaced from the die apertures.

2. The method of claim 1 further comprising heating the fabric substrate such that a portion of the cut element melts when pressed to the fabric substrate and fixes the cut element to the fabric substrate on cooling.

3. The method of claim 1 wherein the foam sheet in part comprises closed cell foam.

\* \* \* \* \*